United States Patent [19]
Venkatesan et al.

[11] Patent Number: 5,773,164
[45] Date of Patent: Jun. 30, 1998

[54] ROBUST TERMINAL FOR RECHARGEABLE PRISMATIC BATTERIES

[75] Inventors: Srinivasan Venkatesan, Southfield; Kenneth Laming, Columbus; Lin Higley, Troy; Michael Marchio, Utica, all of Mich.

[73] Assignee: Ovonic Battery Company, Inc., Troy, Mich.

[21] Appl. No.: 732,537

[22] Filed: Oct. 15, 1996

[51] Int. Cl.[6] .................................................. H01M 2/26
[52] U.S. Cl. ................................................ 429/161; 429/211
[58] Field of Search ..................................... 429/161, 211

[56] References Cited

U.S. PATENT DOCUMENTS

| | | | |
|---|---|---|---|
| 4,209,576 | 6/1980 | Huertel | 429/161 |
| 4,794,056 | 12/1988 | Pedecini | 429/211 X |
| 5,503,948 | 4/1996 | MacKay et al. | 429/161 X |
| 5,571,636 | 11/1996 | Ohta et al. | 429/218 |
| 5,585,206 | 12/1996 | Morris | 429/161 |

*Primary Examiner*—Stephen Kalafut
*Attorney, Agent, or Firm*—Marc J. Luddy; Marvin S. Siskind; David W. Schumaker

[57] ABSTRACT

A robust terminal for a prismatic battery comprising a terminal post, and a connector strap mechanically joined to the terminal post. Electrode tabs are mechanically joined to the connector strap. Connection points between the tabs and the connector strap have two or more degrees of freedom.

11 Claims, 2 Drawing Sheets

ROBUST TERMINAL FOR RECHARGEABLE PRISMATIC BATTERIES

FIELD OF THE INVENTION

The present invention relates generally to improvements for rechargeable prismatic batteries. More specifically, this invention relates to mechanical improvements in rechargeable prismatic battery electrode tab/terminal interconnect design.

BACKGROUND OF THE INVENTION

Rechargeable batteries are used in a variety of industrial and commercial applications such as fork lifts, golf carts, uninterruptable power supplies, and electric vehicles.

Rechargeable lead-acid batteries are a useful power source for starter motors for internal combustion engines. However, their low energy density and their inability to reject heat adequately, makes them an impractical power source for electric vehicles.

Nickel metal hydride batteries ("Ni-MH batteries") are far superior to lead acid batteries, and Ni-MH batteries are the most promising type of battery available for electric vehicles. For example, Ni-MH batteries, such as those described in U.S. Pat. No. 5,277,999 to Ovshinsky and Fetcenko, the disclosure of which is incorporated herein by reference, have a much better energy density than lead-acid batteries, can power an electric vehicle over 250 miles before requiring recharge, can be recharged in 15 minutes, and contain no toxic materials. Electric vehicles using Ni-MH batteries will have exceptional acceleration, and a battery lifetime of more than about 100,000 miles.

Ni-MH batteries employ a positive electrode comprised of nickel hydroxide material and use an alkaline electrolyte. Upon application of an electrical potential across a Ni-MH battery, the negative electrode material is charged by the absorption of hydrogen and the discharge of a hydroxyl ion, as shown in equation (1):

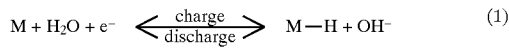
(1)

Upon discharge, the stored hydrogen is released to form a water molecule and release an electron.

The reactions that take place at the nickel hydroxide positive electrode of a Ni-MH battery are shown in equation (2):

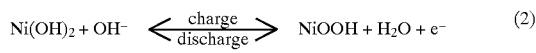
(2)

Extensive research has been conducted into improving the electrochemical aspects of the power and charge capacity of rechargeable prismatic batteries and, in particular, the Ni-MH prismatic batteries. This is discussed in detail in U.S. Pat. Nos. 5,096,667, 5,104,617, 5,238,756, and 5,277,999, the contents of which are specifically incorporated by reference.

Comparatively less time has been spent in improving the mechanical aspects of prismatic batteries. In electric vehicles, the weight of the batteries is a significant factor because battery weight is the largest component of the weight of the vehicle. For this reason reducing the weight of individual batteries is a significant consideration in designing batteries for electric powered vehicles.

In addition to reducing the weight of the batteries, the reliability of the specific components of the battery also need to be improved. One particular area in need of improvement is the electrode-terminal-external connector area. Presently, in prismatic electric vehicle batteries, the battery terminals are solid, cast, cylindrically shaped metal. Electrode tabs (i.e. the internal electrical connectors between the battery electrode plates and the battery terminals) are gathered together and physically bolted to their respective battery terminals. The space required for bolting necessitates a minimum required overhead space (head space) between the tops of the battery electrode plates and the top of the battery case. This requires a length of battery case and a length of electrode tab material both of which add to the weight of the battery without a corresponding increase in battery storage capacity. An additional drawback is that external vibration as well as internal movement and growth of battery electrodes causes loosening of the bolts which connect the electrodes to the terminals. These external and internal forces also cause tab buckling as well as breakage at tab-electrode connections. All of these effects can result in high resistance pathways, reducing battery performance.

Thus, there exists a need for a new prismatic battery terminal design in which the electrical connection components are resistant to the negative effects of a high vibration environment. An ideal solution would also reduce the overall weight of the battery without reducing its energy storage capacity, increases the batteries'reliability, and decreases the cost.

Battery performance is also affected by the techniques used in the battery manufacturing process. For example, certain welding techniques, such as laser welding, can be used to electrically and mechanically connect many battery components. Because laser welding can be used with low-resistance materials, certain components, such as battery terminals and tabs can be made from more conductive materials, thus increasing the overall performance of the battery. While the use of laser welding is described in U.S. Pat. Nos. 5,227,267 and 5,397,660 in regards to lithium cells, solid electrolyte cells and the like, there is no teaching or suggestion of their use with Ni-MH prismatic batteries.

SUMMARY OF THE INVENTION

One objective of the present invention is to increase the reliability of prismatic batteries by making them more robust and thus resistant to external vibrations as well as internal movement and changes in battery electrodes. Another objective of the present invention is to increase the energy storage capacity of the battery by reducing the amount of head space in the battery case. Still another objective of the present invention is to reduce the weight of a prismatic battery. Yet another objective of the present invention is to provide a reliable electrical connection with the electrode tabs without the need for bolting collected tabs onto the terminal.

These and other objectives are achieved by a robust terminal for use as the positive and negative terminal of a prismatic battery, the battery having electrodes electrically connected to the terminal via tabs, the robust terminal comprising: a terminal post and a connector strap mechanically joined to the terminal post, where one or more of the tabs are mechanically joined to the connector strap at tab connection points, and each of the tab connection points having two or more degrees of freedom.

These objectives are also satisfied by a prismatic battery comprising: a positive and negative terminal each electrically connected to electrodes via tabs, each of the terminals comprising: a terminal post and a connector strap mechanically joined to the terminal post where one or more of the tabs are mechanically joined to the connector strap at tab connection points, and each of the tab connection points has two or more degrees of freedom.

These objective are also satisfied by a rechargeable Ni-MH prismatic battery comprising: a positive and negative terminal each electrically connected to electrodes via tabs where one or more of the tabs are mechanically joined to each of the positive and negative terminals by one or more methods chosen from the group consisting of laser welding, electron beam welding, and ultrasonic welding.

DETAILED DESCRIPTION OF THE INVENTION

The following description refers to several embodiments of the invention. This invention may, however, be embodied in many different forms and should not be construed as limited to the embodiments set forth. Like numbers refer to like elements throughout.

Figure 1:
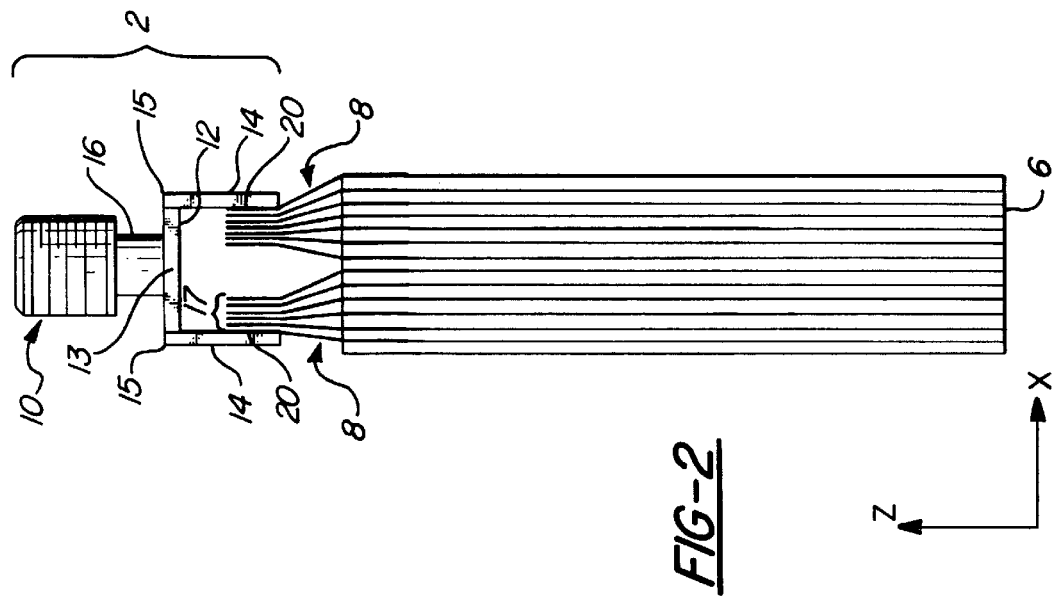
FIG. 1 depicts a three-dimensional view of a prismatic battery.

FIG. 1 is a highly stylized depiction of a three-dimensional view of a prismatic battery 1 having a pair of positive and negative terminals, 2a and 2b, respectively. As shown in FIG. 1, the prismatic battery further comprises a case 3 having a case can 4 and a case top 5. Positioned within the case 3 are one or more positive electrodes 6a and one or more negative electrodes 6b. Electrode separators 7 are positioned between the positive and negative electrodes 6a, 6b. Each of the positive and negative electrodes 6a, 6b have tabs 8 attached to them. The tabs 8 electrically connect the positive and negative electrodes 6a, 6b to the positive and negative terminals 2a, 2b, respectively.

As used herein, the depth, width and height of the prismatic battery are the dimensions defined along the "x", "y" and "z" axis, respectively, as shown in FIG. 1.

Figure 2:
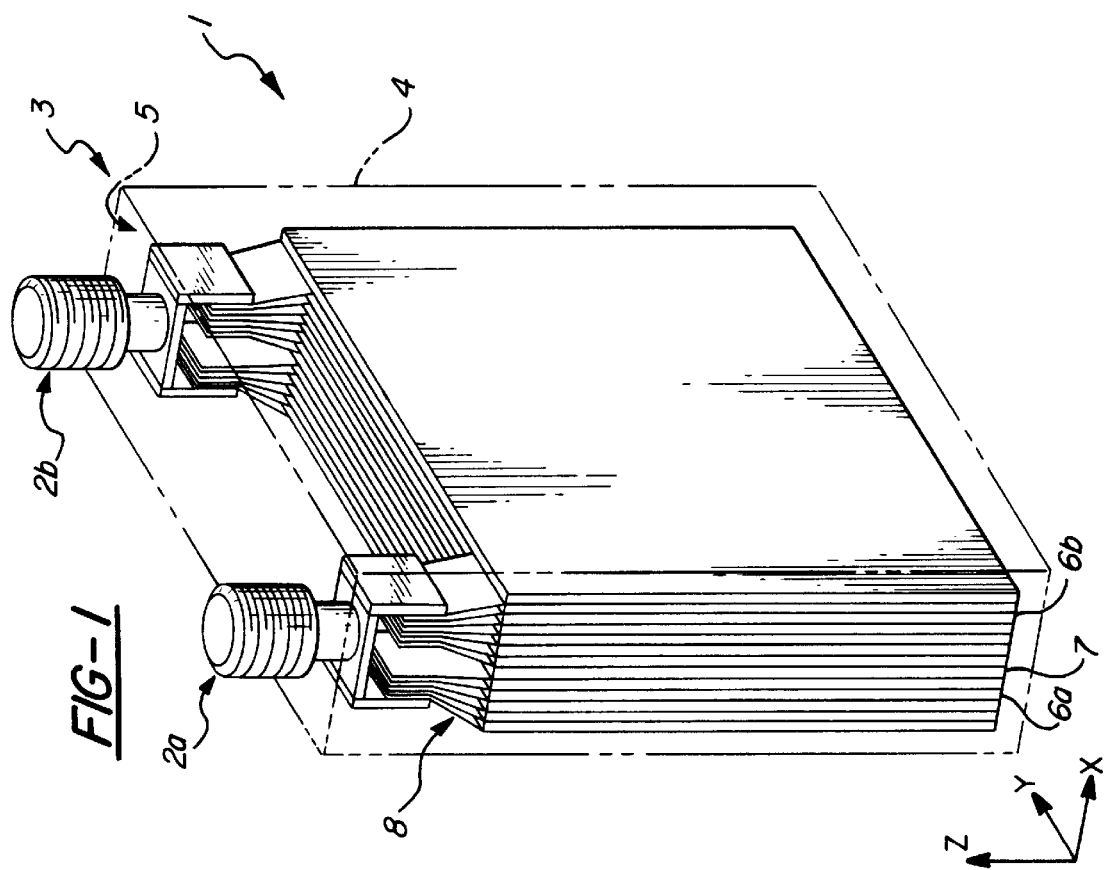
FIG. 2 depicts a cross-sectional view of a robust terminal showing mechanical and electrical connections with tabs and electrodes.

FIG. 2 is a highly stylized cross-sectional depiction of a portion of the prismatic battery shown in FIG. 1. FIG. 2 shows an embodiment of the robust terminal 2, the electrodes 6, and the tabs 8 electrically connecting the electrodes 6 to the robust terminal 2. In FIG. 2, the robust terminal 2 should be interpreted as representing either the positive or negative terminal 2a or 2b of FIG. 1. Similarly, electrodes 6 represent either positive or negative electrodes 6a or 6b.

The embodiment of the robust terminal 2 shown in FIG. 2 comprises a terminal post 10, and a connector strap 11 which is mechanically joined to one end of the terminal post 10. The terminal post 10 shown in FIG. 1 is cylindrical about a central axis, however, other shapes may be used, and in general, the terminal post need not be symmetrical about an axis. Generally, the terminal post 10 may be formed from any electrically conductive material which is inert to battery chemistry. Preferably, the terminal post 10 may be formed of material selected from the group consisting of copper, nickel, nickel-plated copper and mixtures or alloys thereof.

More preferably, the terminal post is formed of nickel-plated copper or nickel-plated copper alloy.

Connector strap 11 comprises a strap base 12. The strap base 12 is mechanically joined to the terminal post 10. Generally, the strap base 12 is mechanically joined to the terminal post 10 so that the strap base 12 is capable of deflection about its point of connection with the terminal post 10. In the embodiment shown in FIG. 2, the strap base 12 is mechanically joined to protrusion 16 of terminal post 10. The point of connection is base connection point 13. The strap base 12 may be mechanically joined to the terminal post 10 by any method including, but not limited to, welding or brazing. Alternately, the terminal post 10 and the strap base 12 may be a single piece.

Connector strap 11 further comprises one or more strap legs 14, each of which is mechanically joined to the strap base 12. In the embodiment shown in FIG. 2, two strap legs 14 are mechanically joined to the edges of the strap base 12 at leg connection points 15. Alternately, the strap legs 14 may be mechanically joined to the side of the strap base 12 opposite that of the terminal post 10. Other configurations are possible provided each strap leg 14 is capable of deflection about its point of connection with the strap base. Each strap leg 14 may be mechanically joined to the strap base 12 by a method such as brazing or welding.

In one embodiment, the terminal post 10, strap base 12 and strap legs 14 are individual pieces which may be connected together by such methods as brazing or welding. In an alternate embodiment, the terminal post 10, strap base 12 and each of the strap legs 14 may all be formed from a single piece of material.

Generally, the robust terminal 2 comprising the terminal post 10, strap base 12, and strap legs 14 may be formed of any electrically conductive material which is compatible with the chemistry of the battery. Preferably, the robust terminal 2 is formed of material selected from the group consisting of copper, nickel, nickel-plated copper, and mixtures or alloys thereof. More preferably, the robust terminal is formed of nickel-plated copper or nickel-plated copper alloy. In an alternative embodiment, the terminal post and strap base are each formed of nickel-plated copper or nickel-plated copper alloy while the strap legs are each formed of nickel.

As discussed above, the tabs 8 electrically connect the electrodes 6 to the robust terminal 2. In the embodiment shown in FIG. 2, one or more tabs 8 are mechanically joined to the connector strap 11. Each point where a tab and the connector strap is mechanically joined is a "tab connection point" 20.

In the embodiment shown in FIG. 2, tabs 8 are connected to the terminal 2 by first collecting the tabs 8 into one or more groups of "tab bundles" 17, and then mechanically joining each tab bundle to the connector strap 11. The tab bundles 17 may be formed by welding or brazing the individual tabs 8 together. In the embodiment shown in FIG. 2, two tab bundles 17 are formed and each tab bundle 17 is mechanically joined to a unique strap leg 14 of the connector strap 11. The point of connection between the strap leg 14 and the tab bundle 17 is a tab connection point 20. Preferably, the tab bundles 17 are welded to the connector strap 11. The method of welding used includes, but is not limited to, resistance welding, TIG welding, laser welding, electron beam welding, and ultrasonic welding. More preferably, each tab bundle 17 may be mechanically joined to the connector strap 11 by one or more methods from the group consisting of laser welding, electron beam welding, and ultrasonic welding. Most preferably, each tab bundle 17 may be mechanically joined to the connector strap by laser welding.

Figure 3:
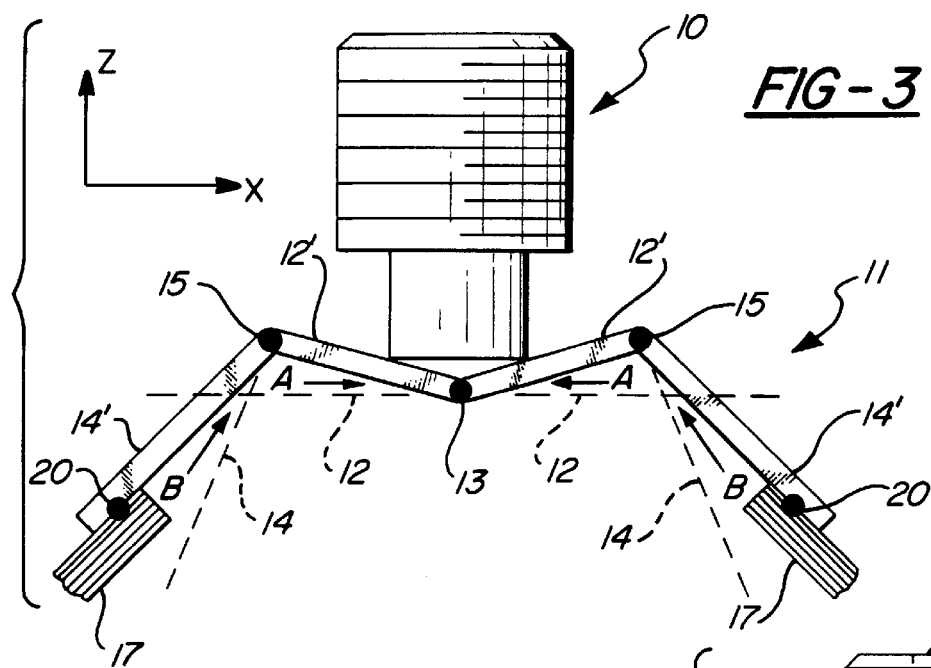
FIG. 3 depicts a cross-sectional view of a robust terminal showing deflection of the connector strap.

Generally, each tab connection point 20 has two or more degrees of freedom. As used herein, "degrees of freedom" is defined as the number of independent variables required to describe the position of each tab connection point 20. FIG. 3 describes this concept, showing a robust terminal 2 where tab bundles 17 are mechanically joined to connector strap 11 at tab connection points 20.

Generally, as shown in FIG. 3, strap base 12 is capable of deflection about its point of connection with the terminal post 10. The amount of deflection is shown by angle A. Angle A is the angle formed by the strap base 12 in its non-deflected position 12 and in its deflected position 12'. Similarly, each strap leg 14 is capable of deflection about its point of connection with the strap base 12. The amount of deflection is shown by angle B. Angle B is the angle formed by each strap leg 14 in its non-deflected position 14 and its deflected position 14'.

In the embodiment of the present invention shown in FIG. 3, the strap base 12 and strap legs 14 are rigid pieces that have negligible flexibility except about the point of connection between the terminal post 10 and strap base 12 (i.e. base connection point 13) as well as points of connection between each strap leg 14 and strap base 12 (i.e. leg connection points 15). In the embodiment shown, the strap base 12 and strap legs 14 deflect yet remain rigid except for movement about the aforementioned points of connection. In this embodiment, the positions of each tab connection point 20 in the "x-z" plane can be defined by angles A and B, where A and B are independent variables (i.e. angle A does not depend upon angle B and angle B does not depend upon angle A). Hence, in this embodiment, each tab connection point 20 has two degrees of freedom.

Figure 4:
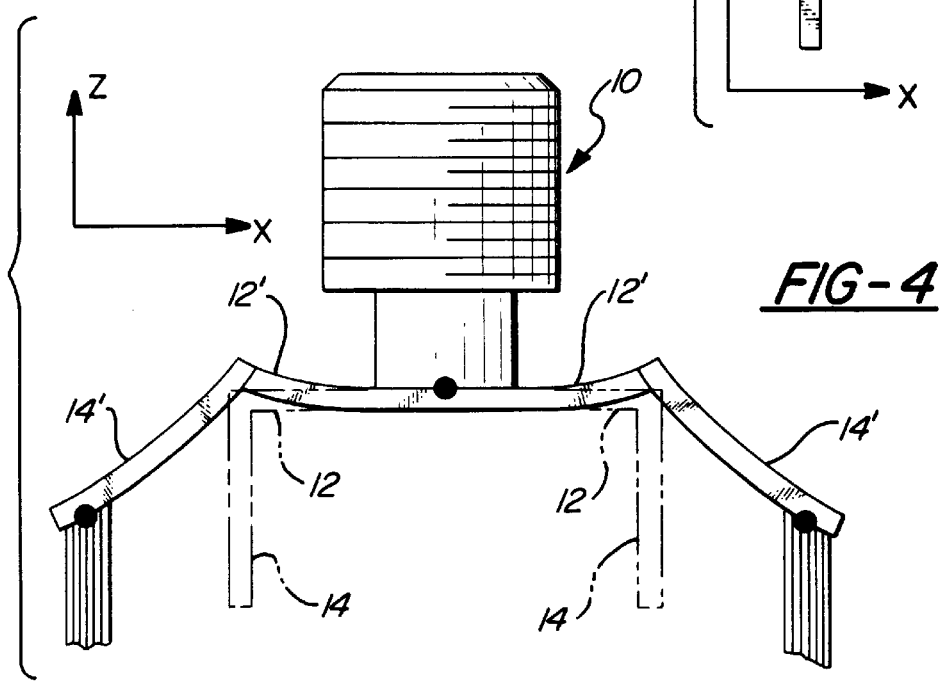
FIG. 4 depicts a cross-sectional view of a robust terminal showing deflection and bending of the connector strap.

Alternately, FIG. 4 shows an embodiment of the present invention in which the strap base and/or strap legs themselves have some degree of flexibility. In this embodiment, the strap base 12 and strap legs 14 are capable of bending and deforming. Possible positions are shown as strap base 12' and strap legs 14'. In this case the angles A and B, as shown in FIG. 3, are no longer adequate to describe the positions of tab connection points 20 in FIG. 4. Additional independent variables are required to define the positions. Hence, in this embodiment, each tab connection point 20 has more than two degrees of freedom.

Because of the increased mobility of each tab connection point 20, the tab bundles 17 can quickly adjust their positions in response to external vibrations as well as movements and dimensional changes of the electrodes 6, thus relieving mechanical stress, decreasing the chance for tab buckling and connection breakage, and increasing battery reliability.

This increased mobility is important, especially with regards to Ni-MH rechargeable batteries where the negative electrode material expands and contracts during charge and discharge cycling. The expansion and contraction causes stress in the material that is relieved by micro-cracking of the material. Since the material is sintered onto negative electrode grids, the stress relief manifests itself as electrode growth in all directions. With reference to the prismatic battery shown in FIG. 1, because the electrodes are severely restricted in their growth in the "x" direction (i.e. depth of the battery case), only growth in the "y" "z" directions is seen (i.e. width and height of the battery case).

The robust terminal provides the mobility needed for the tabs to move and quickly adjust their position in response to electrode growth. The increased mobility of the tab connection points 20 allows the tab bundles to move in directions of both height and depth within the prismatic battery case in response to electrode growth. As mentioned above, this helps to prevent tab buckling as well as breakage at the tab connection points, thus improving battery reliability.

Figure 5:
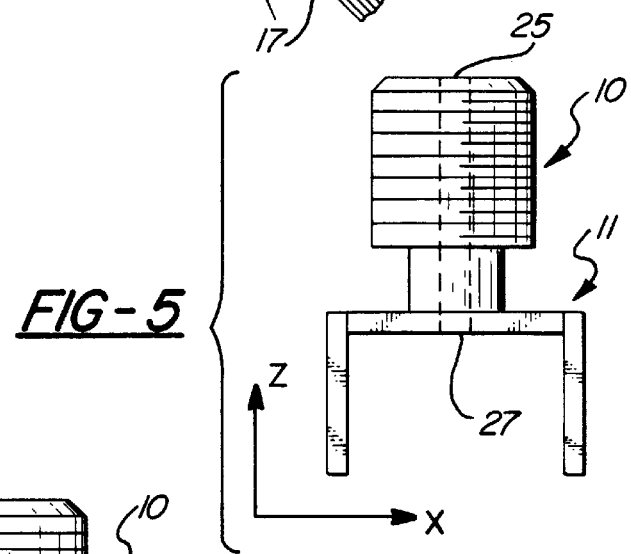
FIG. 5 depicts a cross-sectional view of a robust terminal showing the addition of a terminal opening.

An alternate embodiment of the robust terminal is shown in FIG. 5. In this embodiment, the terminal post 10 has a terminal opening 25 which is aligned with the axis of the terminal post 10. The terminal opening 25 serves to reduce battery weight. It can also serve as the location for an external electrical connector, or for a pressure vent that vents excessive pressure from the interior of the battery to the surrounding atmosphere. The terminal opening 25 can extend partially through the improved terminal or all the way through it. The pressure vent is described in more detail in U.S. Pat. No. 5,472,802 which is incorporated by reference herein. When the improved terminal includes a pressure vent, the terminal opening 25 will extend all the way through to the interior of the battery. As depicted in FIG. 5, in such a case, the connector strap 11 includes a strap opening 27 positioned to overlap the terminal opening 25 so that the terminal opening 25 is not blocked.

Also disclosed herein is a prismatic battery comprising positive and negative terminals each electrically connected to the appropriate electrodes via tabs. Each of the terminals comprises the robust terminal described above.

The prismatic battery, as shown in FIG. 1, also comprises a battery case 3 which includes a case can 4 and a case top 5. The battery case 3 is preferably formed of any material which is thermally conductive, mechanically strong and rigid, and is chemically inert to the battery chemistry, such as a metal. Alternatively, a polymer or composite material may be used as the material for the battery case 3. In choosing a such a material, consideration must be given to thermal heat transfer. As detailed in U.S. Pat. No. 5,558,950, the contents of which are incorporated by reference, experiments with plastic cases show that the internal temperature of a plastic cased metal-hydride battery rises to about 80° C. from ambient after cycling at C/:10to 120of capacity, while a stainless steel case rises to only 32° C. Thus, thermally conductive polymer or composite material cases are preferred. Most preferably the case is formed of stainless steel. It is advantageous to electrically insulate the exterior of the metal case from the environment by coating it with a non-conductive polymer coating (not shown). An example of one such layer is an insulating polymer tape layer made from a polymer such as polyester. The mechanical strength and ruggedness of the polymer tape, as well as its insulating properties, is important. Additionally, it is preferably inexpensive, uniform, and thin.

The interior of the battery case 3 must also be electrically insulated from the positive and negative electrodes 6a, 6b. This can be accomplished by coating an electrically insulating polymer (not shown) onto the interior of the battery case, or alternatively, enclosing the electrodes and electrolyte in an electrically insulating polymer bag (not shown), which is inert to the battery chemistry. This bag is then sealed and inserted into the battery case 3.

The robust terminal may be attached to the case top 5 by several methods. Such methods include, but are not limited to, crimping the robust terminal to the case top 5, and threading the robust terminal to the case top 5.

Any prismatic battery system may benefit from the improved terminal. For rechargeable Ni-MH prismatic batteries in particular, it is preferred that the positive electrodes 6a are formed of a nickel hydroxide material and the negative electrodes 6b are formed of a hydrogen absorbing alloy. Preferably, the negative electrode material is an Ovonic metal-hydride alloy. (That is, a disordered, multi-component metal hydride alloy as described in U.S. Pat. Nos. 5,407,781, and 5,506,069 [both specifically incorporated by reference], and the applications and references that depend from them and are specifically referenced in them.) Also, it is preferable that the electrodes be separated by non-woven, felted, nylon or polypropylene separators and the electrolyte is an alkaline electrolyte, for example, containing 20 to 45 weight percent potassium hydroxide. Such separators are described in U.S. Pat. No. 5,330,861, the contents of which are incorporated by reference.

Also disclosed herein is a rechargeable Ni-MH prismatic battery comprising a positive and negative terminal each electrically connected to electrodes via tabs. One or more of the tabs are mechanically joined to each of the positive and negative terminals by one or more methods in the group consisting of laser welding, electron beam welding, and ultrasonic welding. Preferably, one or more of the tabs are mechanically joined to each of the positive and negative terminals by laser welding or electron beam welding. Most preferably, one or more of the tabs are mechanically joined to each of the positive and negative terminals by laser welding.

Certain welding techniques, such as resistance welding, require that the materials being welded have sufficiently high resistivity to produce the heat necessary for a proper weld. However, laser welding and electron beam welding have the advantage of being able to mechanically connect battery components made from materials with lower resistivities, thus increasing the overall conductivity of the battery.

In the rechargeable Ni-MH prismatic battery of the present invention, the terminals may each be formed of one or more materials chosen from the group consisting of copper, nickel, nickel-plated copper, and mixtures or alloys thereof. However, because laser welding and electron beam welding can mechanically connect materials with lower resistivities, it is preferable that terminals formed of nickel-plated copper or nickel-plated copper be used. In general, laser welding and electron beam welding permit the use of terminals having an increased percentage of copper or copper-alloy.

Furthermore, laser welding and electron beam welding also permit the use of tabs that are formed of materials such as nickelplated copper and nickel-plated copper alloy, further increasing the conductivity of the battery.

Laser welding, in particular, has other advantages besides permitting the use of low-resistance materials in Ni-MH battery components. Laser welding is a high-speed operation and thus decreases the overall cost of the manufacturing process. Furthermore, laser welding creates a low temperature rise on welded parts and can thus be used where it is not practical to use a heat sink in the manufacturing process. In general, laser welding can be used to increase the speed and reliability of many different aspects of manufacturing Ni-MH batteries.

Other welding methods, such as ultrasonic welding, may be used to attach tabs to terminals in rechargeable Ni-MH prismatic batteries. Furthermore, all of the aforementioned welding methods, including laser welding, electron beam welding and ultrasonic welding may be used to electrically and mechanically connect other battery components besides tabs and terminals.

The disclosure set forth herein is presented in the form of detailed embodiments described for the purpose of making a full and complete disclosure of the present invention, and such details are not to be interpreted as limiting the true scope of the invention as set forth and defined in the claims below.

We claim:

1. A robust terminal for a prismatic battery, said battery having electrodes electrically connected to said terminal via tabs, said terminal comprising:

a terminal post; and a connector strap mechanically joined to said terminal post, where one or more of said tabs are mechanically joined to said connector strap at tab connection points, said connector strap comprising:

a strap base mechanically joined to said terminal post, said strap base capable of deflection about its point of connection with said terminal post; and one or more strap legs, each mechanically joined to said strap base, each of said strap legs capable of deflection about its point of connection with said strap base.

2. The robust terminal of claim 1, wherein said terminal post, said strap base, and said strap legs are formed of material selected from the group consisting of copper, nickel, nickel-plated copper, and mixtures or alloys thereof.

3. The robust terminal of claim 2, wherein said terminal post, said strap base, and each of said strap legs are formed of nickel-plated copper or nickel-plated copper alloy.

4. The robust terminal of claim 2, wherein said terminal post and said strap base are formed of nickel-plated copper, and each of said strap legs is formed of nickel.

5. The robust terminal of claim 1, wherein said one or more tabs are mechanically joined to said connector strap by one or more methods selected from the group consisting of laser welding, electron beam welding, and ultrasonic welding.

6. The robust terminal of claim 5, wherein said one or more tabs are mechanically joined to said connector strap by laser welding.

7. The robust terminal of claim 1, wherein said one or more strap legs is two strap legs.

8. A prismatic battery comprising:

a positive and negative terminal each electrically connected to electrodes via tabs, each of said terminals comprising:

a terminal post; and a connector strap mechanically joined to said terminal post, where one or more of said tabs are mechanically joined to said connector strap at tab connection points, said connector strap comprising:

a strap base mechanically joined to said terminal post, said strap base capable of deflection about its oint of connection with said terminal post; and one or more strap legs, each mechanically joined to said strap base, each of said strap legs capable of deflection about its point of connection with said strap base.

9. The battery of claim 8, wherein said terminal post, said strap base, and said strap legs are formed of material selected from the group consisting of copper, nickel, nickel-plated copper, and mixtures or alloys thereof.

10. The battery of claim 11, wherein said one or more tabs are mechanically joined to said connector strap by one or more methods selected from the group consisting of laser welding, electron beam welding, and ultrasonic welding.

11. The battery of claim 10, wherein said one or more tabs are mechanically joined to said connector strap by laser welding.

* * * * *